(12) United States Patent
Siebel

(10) Patent No.: US 10,837,284 B2
(45) Date of Patent: Nov. 17, 2020

(54) ROTOR FOR A TURBOMACHINE

(71) Applicant: MTU Aero Engines AG, Munich (DE)

(72) Inventor: Matthias Siebel, Munich (DE)

(73) Assignee: MTU Aero Engines AG, Munich (DE)

( * ) Notice: Subject to any disclaimer, the term of this patent is extended or adjusted under 35 U.S.C. 154(b) by 119 days.

(21) Appl. No.: 16/056,748

(22) Filed: Aug. 7, 2018

(65) Prior Publication Data
US 2019/0048723 A1  Feb. 14, 2019

(30) Foreign Application Priority Data
Aug. 11, 2017 (DE) .................. 10 2017 214 058 U

(51) Int. Cl.
F01D 5/06 (2006.01)

(52) U.S. Cl.
CPC .......... F01D 5/066 (2013.01); F05D 2220/30 (2013.01); F05D 2230/60 (2013.01); F05D 2250/14 (2013.01)

(58) Field of Classification Search
CPC . F01D 5/022; F01D 5/06; F01D 5/066; F05D 2220/30; F05D 2230/60; F05D 2250/14
See application file for complete search history.

(56) References Cited

U.S. PATENT DOCUMENTS

| 3,688,371 | A | * | 9/1972 | Koff | ........................ | F01D 5/066 |
| | | | | | | 29/889.2 |
| 4,828,441 | A | * | 5/1989 | Frasca | .................. | F01D 25/243 |
| | | | | | | 403/21 |
| 4,844,694 | A | | 7/1989 | Naudet et al. | | |
| 5,388,963 | A | | 2/1995 | Dimmick, III | | |
| 5,492,447 | A | * | 2/1996 | Mannava | ............. | C21D 10/005 |
| | | | | | | 415/200 |
| 6,148,494 | A | | 11/2000 | Lowell et al. | | |
| 6,428,272 | B1 | | 8/2002 | Pepi et al. | | |
| 6,499,957 | B1 | * | 12/2002 | Klingels | ................. | F01D 5/066 |
| | | | | | | 416/198 A |
| 2004/0007830 | A1 | | 1/2004 | Uematsu et al. | | |
| 2009/0297350 | A1 | | 12/2009 | Augustine et al. | | |
| 2011/0206519 | A1 | * | 8/2011 | Heinemann | ............. | F01D 5/066 |
| | | | | | | 416/204 A |
| 2013/0323067 | A1 | * | 12/2013 | Antonellis | ............ | F01D 5/3015 |
| | | | | | | 416/223 R |

(Continued)

FOREIGN PATENT DOCUMENTS

| DE | 19627386 A1 | 1/1997 |
| DE | 60129403 T2 | 4/2008 |

(Continued)

Primary Examiner — Igor Kershteyn
(74) Attorney, Agent, or Firm — Davidson, Davidson & Kappel, LLC

(57) ABSTRACT

A rotor (100) for a turbomachine is provided, having at least two bladed, detachably interconnected rotor stages (1, 3, 6), a flange (17) of a first rotor stage (1) being attached to a rotor disk (25) of a second, adjacent rotor stage (3) via at least one fastening element (7). The rotor disk (25) has a through bore (11) for connecting the two rotor stages (1, 3) by the fastening element (7); the through bore (11) having a cross section that is larger in the circumferential direction (u) of the rotor disk (25) than in the radial direction (r) thereof.

22 Claims, 2 Drawing Sheets

(56) References Cited

U.S. PATENT DOCUMENTS

| 2014/0147269 | A1* | 5/2014 | Porte | F02C 7/04 |
| | | | | 415/213.1 |
| 2016/0123373 | A1* | 5/2016 | Gambardella | F01D 11/003 |
| | | | | 411/108 |
| 2017/0335719 | A1* | 11/2017 | Hendrickson | F01D 5/02 |

FOREIGN PATENT DOCUMENTS

| EP | 1092 081 B1 | 7/2003 |
| EP | 3246517 | 11/2017 |
| GB | 2057617 | 4/1981 |
| GB | 2303188 A | 2/1997 |
| JP | S5870096 | 4/1983 |

\* cited by examiner

ROTOR FOR A TURBOMACHINE

This claims the benefit of German Patent Application DE 102017214058.5, filed Aug. 11, 2017 and hereby incorporated by reference herein.

The present invention relates to a rotor for a turbomachine, having at least two bladed, detachably interconnected rotor stages.

BACKGROUND

The turbomachine rotors, as known from the related art, have a plurality of rotor stages, it being possible for the rotor stages to be interconnected in different ways. Flange joints are often used, a rotor stage connected by a shaft being connected to other rotor stages by flanges. Depending on the operating conditions, these connections of the rotor stages are often subject to high loads. Both the stress level, as well as the stress amplitudes can determine the service life of the particular components.

SUMMARY OF THE INVENTION

It is an object of the present invention to provide a further rotor that at least minimizes the mentioned problems.

A rotor for a turbomachine is provided that has at least two bladed, detachably interconnected rotor stages. A first rotor stage is attached by a flange to a rotor disk of a second, adjacent rotor stage via at least one fastening element. In particular, the connection is detachable via a bolted connection, for example. The rotor disk of the second rotor stage has a through bore for connecting the two rotor stages. The connection features a fastening element, for example, a bolt, a threaded member or the like, that may be passed or inserted through the through bore. The cross section of the through bore is larger in the circumferential direction of the rotor disk than in the radial direction thereof.

Advantageous further embodiments of the present invention constitute the subject matter of the specific embodiments.

Exemplary specific embodiments according to the present invention may include one or more of the features mentioned in the following.

In some specific embodiments of the present invention, the through bore has an elliptical cross section, the major axis of the elliptical cross section being larger in the circumferential direction of the rotor disk than the minor axis in the radial direction of the rotor disk. The elliptical shape is particularly advantageous in terms of stress design.

In other specific embodiments according to the present invention, the through bore has the form of an elongated hole, in particular having a cross-sectional shape that is formed by two parallel linear or curved boundary lines in the circumferential direction, as well as by two semicircular boundary lines that connect the parallel boundary lines, respectively.

In the context of a linear segment, "in the circumferential direction" may, in particular relate to the direction at the circumferential position of the center of the through bore.

In other specific embodiments of the present invention, the through bore again has another shape whose maximum dimension, respectively extent in the circumferential direction is, in fact, likewise larger than in the radial direction.

In some specific embodiments of the present invention, a rotor stage includes a blade having a blade root, a rotor main body, a rotor disk, and, optionally a rotor arm and a flange. The rotor arm may have at least one sealing tip for sealing against leakage flows. The rotor stage may be integrally manufactured, i.e., in a single-unit design, for example, as a cast part or by an additive manufacturing process. Alternatively, the blade, respectively the blades configured over the periphery of the rotor main body may be separately manufactured, and subsequently assembled together.

In some specific embodiments of the present invention, adjacent rotor stages are successively configured in the through flow direction of the turbomachine. A rotor may include three, five, seven, nine or more rotor stages. One or more of the rotor stages of a rotor may be connected to a shaft of the turbomachine. For example, the second and the last or next-to-last rotor stage may be connected to the shaft of the turbomachine.

In some specific embodiments of the present invention, the through bore is configured at the radially outer end region of the rotor disk at or before the transition to the rotor main body. Several through bores may be placed over the periphery of the rotor disk to achieve a most reliable and stable possible connection of the rotor stages. Particularly in the case of a turbomachine configured as an axial gas turbine, for example, as an aircraft engine, 10, 20, 40, 60 or more through bores may be configured over the periphery. The configuration may be symmetrical or asymmetrical over the periphery. To connect the rotor stages, all or only some of the through bores may be provided with retaining elements, respectively fitted and installed therewith. For example, when a strength analysis, that may be implemented experimentally or by simulation, reveals that it is only necessary to install a portion of the through bores, only a portion of the through bores are installed with retaining elements in order to reduce weight (which may result in a lower fuel consumption and thus be more economical). As the case may be, the technically necessary number may be increased for safety reasons.

Relative to the through flow direction of the turbomachine, some specific embodiments of the present invention provide that the flange of the first rotor stage be located at the axially downstream end of a rotor arm of the first rotor stage. In this configuration, the first and second rotor stage, together with the rotor arm and the flange, may form what is commonly known as a rotor drum. The rotor arm may have a radially outwardly directed through bore to allow fluid to flow off, respectively be spun off from the rotor drum.

Some specific embodiments of the present invention provide that a flange of the third rotor stage be configured at the axial upstream end of a rotor arm of the third rotor stage relative to the through flow direction of the turbomachine. Thus, in an advantageous, compact design, a flange configured at the downstream end of the rotor arm of the first rotor stage and a flange configured at the upstream end of the rotor arm of the third rotor stage may be mounted together and attached to the rotor disk of the second rotor stage. For the mounting, a retaining element may interconnect and fix in position all three components, thus the flanges of the first and third rotor stage, together with the rotor disk of the second rotor stage.

In some specific embodiments of the present invention, the first rotor stage is an upstream first rotor stage of the rotor. In this specific embodiment, a shape according to the present invention, namely having a larger extent in the circumferential direction than in the radial direction, in particular an elliptical shape of the through bore of the rotor disk of the second rotor stage, that is connected by the retaining element to the first rotor stage, may advantageously reduce occurring high stress levels and stress amplitudes in the area of the through bore and thus, for example, contribute to a prolongation of the service life. In this specific embodiment, the second rotor stage is often connected to the shaft of the turbomachine and often subject to high loads. Besides the high mechanical loads in the form of high stress levels and stress amplitudes, a high operating temperature may also occur in the area of the through bore of the rotor disk of the second rotor stage. Here as well, the inventive shape of the through bore of the rotor disk of the second rotor stage may also contribute to less damage to the rotor disk and/or to a greater service life of the component.

In some specific embodiments according to the present invention, the fastening element of the second rotor stage is attached to the flange of the third rotor stage. The fastening element may interconnect the rotor disk of the second rotor stage and the flange of the third rotor stage. In addition, the flange of the first rotor stage may be optionally attached to the rotor disk of the second rotor stage and to the flange of the third rotor stage.

In some specific embodiments according to the present invention, the cross-sectional dimensions of through bore (11) in circumferential direction (u) of rotor disk (25) are at most 20%, in particular at most 15%, additionally, in particular at most 10%, in particular at most 5% larger than the cross-sectional dimensions of through bore (11) in radial direction (r) of rotor disk (25).

In some specific embodiments according to the present invention, the major axis of the elliptical cross section, which is oriented in the circumferential direction of the rotor disk, is at most 20% larger than the minor axis of the elliptical cross section, which is oriented in the radial direction of the rotor disk. Purely exemplarily, the length, respectively extent of the minor axis of the elliptical cross section of the through bore may be 9 mm, for example, so that the length, respectively extent of the major axis is at most 10.8 mm. Depending on the size of the retaining element, for example, of a shank diameter of a bolt or of a threaded member, the length, respectively extent of the minor axis may be adapted, in particular.

In some specific embodiments according to the present invention, the major axis of the elliptical cross section, which is oriented in the circumferential direction of the rotor disk, is at most 15% larger than the minor axis of the elliptical cross section, which is oriented in the radial direction of the rotor disk.

In some specific embodiments according to the present invention, the major axis of the elliptical cross section, which is oriented in the circumferential direction of the rotor disk, is at most 10% larger than the minor axis of the elliptical cross section, which is oriented in the radial direction of the rotor disk.

In some specific embodiments according to the present invention, the major axis of the elliptical cross section, which is oriented in the circumferential direction of the rotor disk, is at most 5% larger than the minor axis of the elliptical cross section, which is oriented in the radial direction of the rotor disk.

In some specific embodiments according to the present invention, the length, respectively extent of the minor axis of the elliptical cross-section of the through bore is at most 10% larger than the diameter of a shank of the fastening element in the through bore. The fastening element may be a bolt, for example. In a first manufacturing step, the through bore may be a circular bore having an interference fit. This circular bore may subsequently be widened to an elliptical through bore, for example, with the aid of a spiral milling. This widening may provide a maximum widening of the length, respectively elongation of the minor axis to an additional length of 10% over the diameter of the previously configured circular bore. Purely exemplarily, the circular bore could have a diameter of 9 mm. The length, respectively extent of the minor axis may then be limited at most to 9.9 mm.

In some of the specific embodiments according to the present invention, the length, respectively extent of the minor axis of the elliptical cross section of the through bore is at most 5% larger than the diameter of a shank of the fastening element in the through bore.

In some specific embodiments according to the present invention, the fastening element is a bolt having a bolt head and a retaining element.

In some specific embodiments of the present invention, the shank of the fastening element has a thread. The retaining element may be a nut.

In some specific embodiments of the present invention, the through bore is surface-treated. Following a widening by a mechanical machining process of an initially circular through bore, for example, using a cutting method, in particular a milling process, the surface of the through bore may, in fact, be enhanced by a surface treatment. An enhancement of the surface may be quantified using a lower arithmetical mean roughness value thereof.

A surface treatment may include a blasting and/or a deep rolling and/or a finish rolling. A surface treatment may advantageously prolong the service life of the component, particularly if the component is subject to high mechanical loads, for example, high mechanical stress loads and/or high mechanical stress amplitudes.

In some of the specific embodiments according to the present invention, the surface of the through bore has an arithmetical mean roughness value of at most 0.4 µm, in particular of at most 0.2 µm.

In some of the specific embodiments according to the present invention, the rotor is a rotor of a gas turbine stage, in particular of a low-pressure turbine.

In some of the specific embodiments according to the present invention, the turbomachine is an axial gas turbine.

In some of the specific embodiments according to the present invention, the axial gas turbine is an aircraft engine.

Many or all of the specific embodiments of the present invention may feature one, several or all of the advantages mentioned above and/or in the following.

Via a through bore for a retaining element, the inventive rotor is able to advantageously at least reduce damage caused by a high mechanical stress level and/or high mechanical stress amplitudes in a rotor stage. The non-circular, in particular elliptical cross section of the through bore makes it possible for the inventive rotor to minimize the material load in the rotor stage, especially in that rotor disk which features a through bore for a retaining element. The damage may be referred to as component damage.

In comparison to a through bore having a circular cross section, by using a non-circular, in particular elliptical cross section of the through bore, the rotor according to the present invention is able to advantageously minimize the occurring mechanical stress amplitudes. Purely exemplarily, for example, the stress amplitude at the surface of the through bore, in a type of loading as occurs in an aircraft engine, may be reduced from approximately 2,000 MPa in the case of a circular cross section to approximately 1,800 MPa in the case of an elliptical cross section.

The inventive rotor is able to improve what is generally referred to as rotor parameter "LCF" (low-cycle fatigue), for example, from an LCF of approximately 20,000 c/s (cycles per second) in the case of a rotor having a circular cross section of the through bore, to an LCF of approximately 25,000 c/s (cycles per second) in the case of a rotor having an elliptical cross section of the through bore.

The rotor according to the present invention makes it possible for the mechanical load of the through bore for connecting the rotor stages to be advantageously adapted in a way that allows the loads to be approximately equal in the area of the radially inner diameter of the through bore, in the area of the radially outer diameter of the through bore, as well as in the area of what are generally referred to as spokes, thus in the area of the peripheral surface of the through bore (see FIG. 2). When the through bore has such a nearly approximately equal load situation at the surfaces, it may be referred to as an at least approximately, optimally designed through bore. Therefore, the inventive rotor advantageously makes possible an at least approximately, optimally designed through bore.

A damage to a component may be defined as a through bore having a crack formation emanating from the surface of the through bore and continuing into the material of the component. For example, a damage to a component may have a technical incipient crack having a crack depth of at least approximately 0.4 mm to 0.8 mm, these values being purely exemplary. Crack depths of this kind may occur in specific embodiments where the rotor is part of an aircraft engine, in particular part of a low-pressure turbine therein. For example, the aircraft engines may be examined in preset maintenance intervals to check for such crack formations. The maintenance intervals may be implemented after a certain number of cycles of the component determined, for example, in accordance with the aircraft movements of the aircraft engine. It is possible to determine the aircraft movements on the basis of the take-offs and landings of an aircraft having the aircraft engine.

A component damage may also be used as a characteristic, respectively indication of the service life of a component. Thus, the exemplarily indicated crack depths may at least affect the service life of the component. Thus, via the non-circular, in particular elliptical cross section of the through bore, the inventive rotor makes it possible to advantageously prolong the service life of the rotor.

Another factor that affects crack formation, as described above, is the component temperature. High temperatures, which may affect the crack formation, occur in low-pressure turbines and/or high-pressure turbines of aircraft engines, in particular. For that reason, in low-pressure turbines and/or high-pressure turbines of aircraft engines, in particular, the rotor according to the present invention may advantageously at least reduce a component damage and/or prolong the service life of the rotor.

The rotor according to the present invention may advantageously reduce the number of fastening elements for connecting the rotor stages. Fewer fastening elements per rotor stage may result in a lower weight of the rotor due to a reduced component load accomplished by a non-circular, in particular elliptical cross section of the through bores for fastening elements. A lower weight may result in cost savings, for example, due to a reduced fuel consumption of an aircraft engine.

Using the inventive rotor, it is advantageously possible to reach a permissible LCF value, for example, an LCF value of 25,000 c/s for a low-pressure turbine in an aircraft engine, without having to increase the number of through bores and fastening elements per rotor disk. The LCF value of 25,000 c/s may be achieved, for example, by an elliptical cross section of the through bores.

BRIEF DESCRIPTION OF THE DRAWINGS

The present invention is explained exemplarily in the following with reference to the accompanying drawings, in which identical reference numerals denote like or similar components. It holds in the highly schematically, simplified figures that.

DETAILED DESCRIPTION

Figure 1:
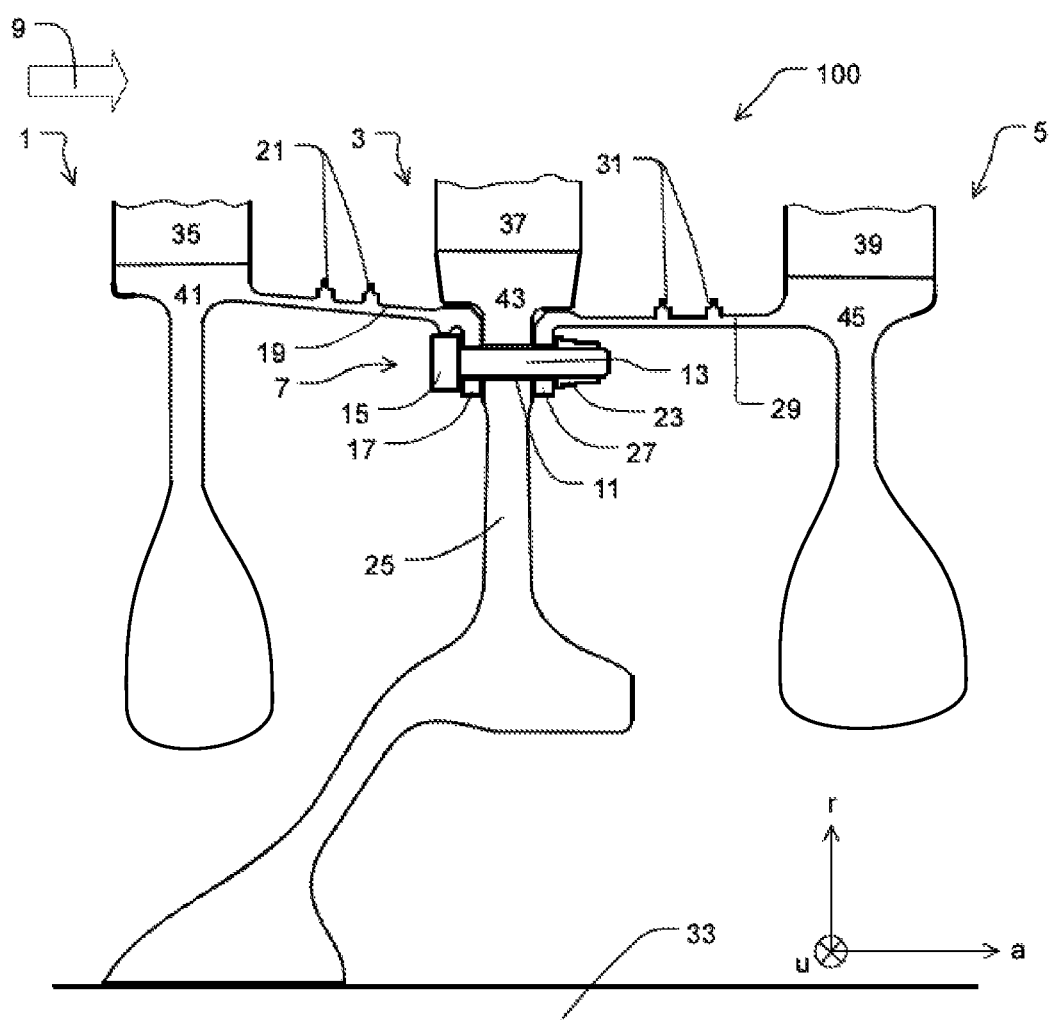
FIG. 1 shows a rotor according to the present invention having three rotor stages that are interconnected by a bolt.

FIG. 1 shows an inventive rotor 100 for an axial turbomachine having three rotor stages 1, 3, 5 that are interconnected by a bolt 7.

Rotor stage 3, which is in the middle in FIG. 1 and, viewed in through flow direction 9 of the turbomachine, is second rotor stage 3 of rotor 100, features a through bore 11 through rotor disk 25 of second rotor stage 3, through which bolt shank 13 of bolt 7 is passed or inserted. The cross-sectional shape of through bore 11 is shown in greater detail in FIG. 2. A flange 17 of first rotor stage 1 is configured on axial downstream end region of rotor arm 19. In addition, rotor arm 19 has sealing tips 21 for sealing a possible leakage flow between rotor arm 19 and a guide vane (not shown in FIG. 1).

Bolt 7 has a bolt head 15 that rests against flange 17 of first rotor stage 1. Purely exemplarily, at the periphery thereof, bolt head 15 rests against a shoulder of rotor arm 19. This resting against may act as a locking against rotation upon tightening the connection of the three rotor stages 1, 3, 5. To tighten, respectively secure the connection of the three rotor stages 1, 3, 5, purely exemplarily, bolt shank 13 features a thread on bolt shank end (to the right in FIG. 1) upon which a retaining element, here, exemplarily, a nut 23 is screwed. Other securing options, for example, using a cotter pin are likewise possible.

Third rotor stage 5 (configured on the right in FIG. 1) is likewise connected by a flange 27 and bolt 7 to second rotor stage 3 and indirectly to first rotor stage 1. In contrast to flange 17 of first rotor stage 1, flange 27 of third rotor stage 5 is configured at upstream front end of rotor arm 29 (viewed in through flow direction 9).

Second rotor stage 3 is connected to a shaft 33 of the axial turbomachine. For the sake of clarity, this connection is not explained. The connection may be a keyway connection, for example. First 1 and third 3 rotor stage of rotor 100 according to the present invention are connected to shaft 33 by this connection.

All three rotor stages 1, 3, 5 are bladed, thus have rotor blades 35, 37, 39 that are directed radially outwardly relative to rotor main body 41, 43, 45.

As illustrated in FIG. 1, through bore 11 traversing rotor disk 25 and blades 37 configured on rotor disk 25 may have the same axial position, and/or through bore 11 may be configured in the axial region of extent of blades 37.

Figure 2:
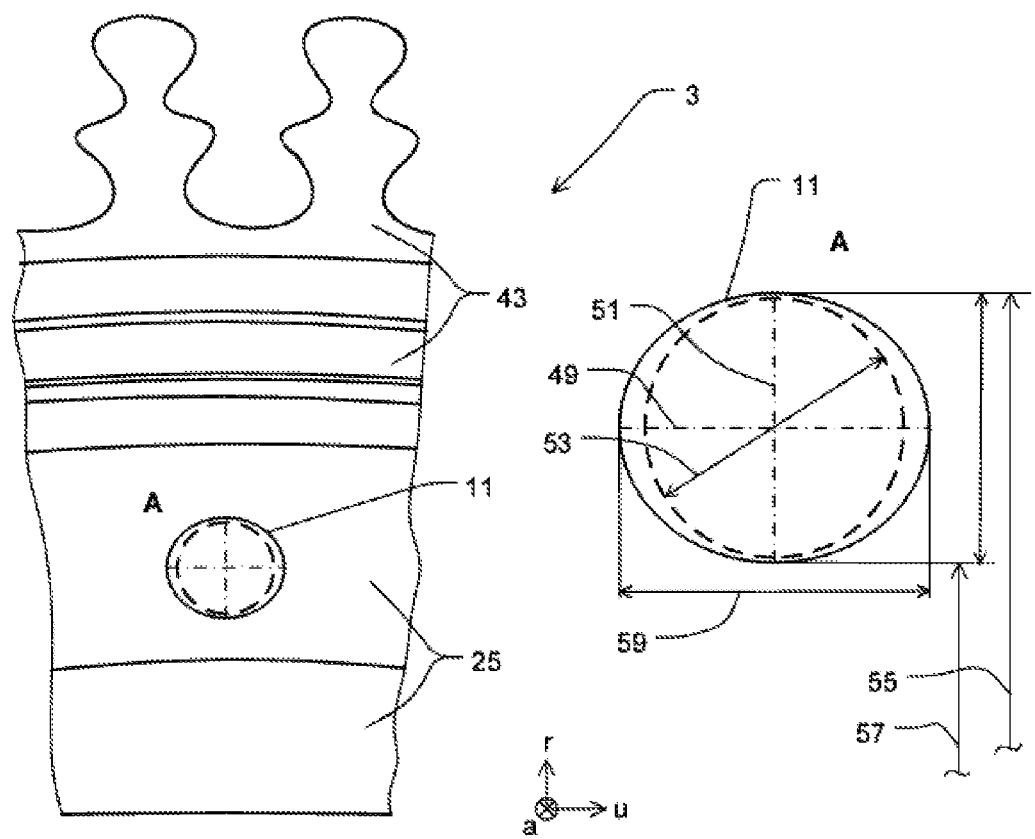
FIG. 2 shows a view of a portion of a rotor disk of an inventive rotor having a through bore that has an elliptical cross section.

FIG. 2 shows a view of a portion of second rotor disk 3 of an inventive rotor 100 having a through bore 11 that has an elliptical cross section.

Relative to the view of FIG. 1, rotor disk 3 is rotated by 90 degrees into the drawing plane. In FIG. 2, circumferential direction u points to the right; axial direction a into the drawing plane.

Purely exemplarily, rotor main body 43 has a dovetailed shape radially r outwardly for connection to a blade root of blade 37 (see FIG. 1). In the same way, the entire rotor, thus blades 37, together with blade roots, rotor main body 43 and rotor disk 25, may have an integral (one piece) design.

In a magnified view, through bore 11, which extends in axial direction a through entire rotor disk 25, is shown as enlarged detail A to the right in FIG. 2. In accordance with the present invention, through bore 11 has an elliptical cross section. In circumferential direction u, major axis 49 of the elliptical cross section is larger than minor axis 51 that is oriented in radial direction r of rotor disk 25. The length, respectively extent of major axis 49 may be referred to as spoke 59. The spoke may be abbreviated as "rad." Outer diameter 55, respectively outside diameter relative to radial direction r may be abbreviated as "OD;" inner diameter 57, respectively inside diameter as "ID."

To illustrate this, a round diameter 53 is shown by a dashed line. It would correspond to a bolt bore without the elliptical cross section according to the present invention. This bolt bore would feature a clearance fit relative to the bolt shank diameter, for example. Other fits or bore diameters for a bolt bore would likewise be possible. The elliptical cross section may be manufactured, for example, in such a way that a round through bore is initially produced and an elliptical widening subsequently follows in a spiral milling process, for example.

Elliptical cross section 11 according to the present invention advantageously makes possible a minimized material load of rotor disk 25 in the area of through bore 11. In the case of an operational use of a rotor 100 according to the present invention in a turbomachine, in particular in an aircraft engine, the (mechanical) stress level, as well as the stress amplitude in the area of through bore 11, caused by bolt 7, may take on levels that may lead to a damage and thus to a reduced service life of the component.

In other specific embodiments (not shown) according to the present invention, the cross section of the through bore may have a different non-circular and non-elliptical shape, whose, in particular, maximum dimension, respectively extent in the circumferential direction is larger than in the radial direction, and which likewise makes possible an enhancement as compared to a through bore having a circular cross section.

REFERENCE NUMERAL LIST r radial; radial direction
a axial; axial direction
u circumferential direction
100 rotor
1, 3, 5 rotor stage
7 fastening element, bolt
9 through flow direction of the turbine
11 through bore
13 shank, shank of the bolt
15 bolt head
17 flange of the first rotor stage
19 rotor arm of the first rotor stage
21 sealing tips of the first rotor arm
23 retaining element, nut
25 rotor disk of the second rotor stage
27 flange of the third rotor stage
29 rotor arm of the third rotor stage
31 sealing tips of the first rotor arm
33 shaft
35, 37, 39 blades
41, 43, 45 rotor main body
47 blade root of the second rotor stage
49 major axis of the elliptical cross section
51 minor axis of the elliptical cross section
53 diameter of a bolt bore
55 outside diameter, outer diameter
57 inside diameter, inner diameter
59 spoke, length, respectively extent of major axis

The invention claimed is:

1. A rotor for a turbomachine, the rotor comprising:
at least two bladed, detachably interconnected rotor stages including a first rotor stage and an adjacent second rotor stage, a flange of the first rotor stage being attached to a rotor disk of the second rotor stage via at least one fastener element, the rotor disk having a through bore for connecting the first and second rotor stages by the fastener element, the through bore having a cross section larger in a circumferential direction of the rotor disk than in a radial direction of the rotor disk;
wherein the cross-sectional dimensions of the through bore in the circumferential direction of the rotor disk are at most 20% larger than the cross-sectional dimensions of the through bore in the radial direction of the rotor disk.

2. The rotor as recited in claim 1 wherein the through bore has an elliptical cross section, the elliptical cross section having a major axis larger in the circumferential direction of the rotor disk than a minor axis in the radial direction of the rotor disk.

3. The rotor as recited in claim 1 wherein the through bore has an elongated hole shape.

4. The rotor as recited in claim 1 wherein the through bore is configured at a radially outer end region of the rotor disk at a transition to a rotor main body.

5. The rotor as recited in claim 1 wherein the flange of the first rotor stage is located at the axially downstream end of a rotor arm of the first rotor stage relative to a through flow direction of the turbomachine.

6. The rotor as recited in claim 1 wherein the at least two rotor stages include a third rotor stage, a third rotor stage flange being configured at an axial upstream end of a rotor arm of the third rotor stage relative to a through flow direction of the turbomachine.

7. The rotor as recited in in claim 1 wherein the first rotor stage is a first upstream rotor stage of the rotor.

8. The rotor as recited in claim 6 wherein the fastener element is attached to the third rotor stage flange.

9. The rotor as recited in claim 1 wherein in the circumferential direction of the rotor disk, a major axis of an elliptical cross section is at most 20% larger than a minor axis in the radial direction of the rotor disk.

10. The rotor as recited in claim 1 wherein the cross-sectional dimensions of the through bore in the circumferential direction of the rotor disk are at most 15% larger than the cross-sectional dimensions of the through bore in the radial direction of the rotor disk; or, in the circumferential direction of the rotor disk, a major axis of an elliptical cross section is at most 15% larger than a minor axis in the radial direction of the rotor disk.

11. The rotor as recited in claim 1 wherein the cross-sectional dimensions of the through bore in the circumferential direction of the rotor disk are at most 10% larger than the cross-sectional dimensions of the through bore in the radial direction of the rotor disk; or, in the circumferential direction of the rotor disk, a major axis of an elliptical cross section is at most 10% larger than a minor axis in the radial direction of the rotor disk.

12. The rotor as recited in claim 1 wherein the cross-sectional dimensions of the through bore in the circumferential direction of the rotor disk are at most 5% larger than the cross-sectional dimensions of the through bore in the radial direction of the rotor disk; or, in the circumferential direction of the rotor disk, a major axis of an elliptical cross section is at most 5% larger than a minor axis in the radial direction of the rotor disk.

13. The rotor as recited in claim 2 wherein the minor axis of the elliptical cross section of the through bore is at most 10% larger than a diameter of a shank of the fastener element in the through bore.

14. The rotor as recited in claim 2 wherein the minor axis of the elliptical cross section of the through bore is at most 5% larger than a diameter of a shank of the fastener element in the through bore.

15. The rotor as recited in claim 1 wherein the fastener element includes a bolt having a bolt head and includes a retainer element.

16. The rotor as recited in claim 15 wherein a shank of the bolt has a thread, and the retainer element being a nut.

17. The rotor as recited in claim 1 wherein a surface of the through bore has an arithmetical mean roughness value of at most 0.4 µm.

18. The rotor as recited in claim 1 wherein a surface of the through bore has an arithmetical mean roughness value of at most 0.2 µm.

19. An axial gas turbine stage comprising the rotor as recited in claim 1.

20. A low-pressure turbine comprising the axial gas turbine stage as recited in claim 19.

21. An axial gas turbine comprising the turbomachine, the turbomachine including the rotor as recited in claim 1.

22. An aircraft engine comprising the axial gas turbine as recited in claim 21.

* * * * *